Dec. 12, 1967   T. J. JESTER   3,357,125
WEEDLESS FISHHOOK WITH IMPROVED GUARD
Filed Aug. 26, 1965

Thomas J. Jester
INVENTOR.

BY Clarence A. O'Brien
and Harvey B. Jackson
Attorneys

United States Patent Office 3,357,125
Patented Dec. 12, 1967

3,357,125
WEEDLESS FISHHOOK WITH IMPROVED
GUARD
Thomas J. Jester, Box 7A, Nelson Rte.,
Searchlight, Nev. 89046
Filed Aug. 26, 1965, Ser. No. 482,746
7 Claims. (Cl. 43—43.4)

This invention relates to an improved weedless fishhook wherein the fishhook is conventional in that it embodies a shank with a barbed hook at the bait-carrying end, and wherein it is equipped with a novel bite and line pull responsive weed guard with which the fishing line's leader is oriented and coordinated in a uniquely advantageous manner.

Briefly, the improved concept herein disclosed is characterized by a single straight shank having a barbed hook at one end and a fish line eye at the other end. Where a snelled hook, instead of a regular hook, is used, the eye is omitted, as usual, and the leader is attached to the shank according to custom. A spring steel wire or an equivalent resilient weed guard bridges the usual gap between the shank and barbed end of the hook and has one end anchored on the hook's shank. The other end has a specially formed catch which is releasably engageable with a median portion of the barbed bill and is yieldingly applied and normally closed. A fishing line leader has a portion thereof operatively associated with a median portion of the guard and is also oriented with the fishhook components in such a way that it affords the fisherman a means of positively retracting the guard and clearing the barbed hook the moment he senses the strike of a fish. The step of depressing and opening of the guard is no longer up to and wholly dependent on the biting action of the fish. Accordingly, the fishhook with the improved spring-tensioned self-closing guard and the novelly arranged and pull controlled leader coordinated with the shank of the fishhook and guard is as effective as a regular fishhook having no weed guard thereon.

A significant objective of the present invention is to provide a fishhook with a guard which functions to minimize objectionable snagging but, at the same time does not interfere with the primary purpose, namely, effectively hooking and trapping the victim fish. Weed guards of varying type (some similar to the style herein disclosed) have been in vogue for years on end but the experienced fisherman will acknowledge the fact that he is lucky to land one fish out of two or three strikes. Thus, where the fish is called upon to spring and depress the guard, the chances of success are relatively poor. On the other hand, and as actual trial and error experience has shown the herein revealed sensitive constantly tensioned guard is timely and repeatedly effective for the reason that the line held by the fisherman provides him with positively performing means for retracting the guard immediately upon sensing the strike of the fish.

Although the inherent tension in the spring wire guard may be selected in manufacture to be commensurate with the size of the hook desired, a certain amount of manual adjustment is available to the fisherman to adjust the device to his particular fishing needs. That is the guard can be manually bent down to provide a new "set" resulting in a lighter tension against the barb of the hook for still fishing, or conversely, bent upwards to provide a greater tension for casting or trolling. In the event that the weedless device becomes disengaged from under the pointed barb the hook through the striking action of a fish or from other obstructive means, the extended spring wire weed guard continues to serve as a weedless device without acting as a deterrent to successive strikes by the fish or to subsequent hooking of the fish. In fact, the guard will assume its normal position at the next cast due to tension on the line during the casting motion. Then, too, the guard may also be reset by means of a sharp tug on the line while still fishing. Furthermore, the guard also serves as a bait holder in that it will prevent a live bait from wriggling off the hook while still fishing.

These together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 5:
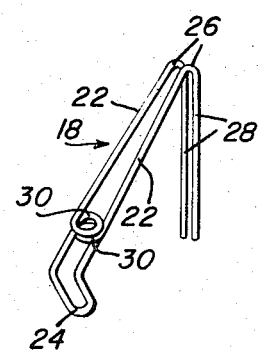

And FIG. 5 is a perspective view of the weed guard by itself.

As previously pointed out, it is within the purview of the inventive concept to utilize the novel guard on and in conjunction with a snelled hook that is, wherein the line or leader is preattached and permanently connected with the shank of the hook. It will simplify the present disclosure, however, to construe the fishhook as one of a conventional type. In FIGS. 1 to 4, inclusive, the fishhook is denoted by the numeral 8 and comprises a single straight shank 10 having an oblique angled line eye 12 at one end and the customary hook comprising the return bend 14 and pointed barb 16 at the other end. The improved guard is denoted by the numeral 18 and the fishing line by the numeral 20.

Figure 4:
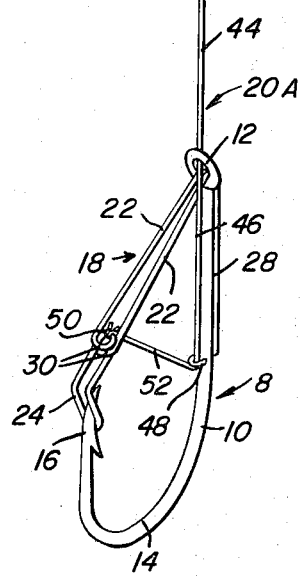
FIG. 4 is a view in perspective similar to FIG. 1 and showing a slight modification.

The guard 18 is essentially the same in both embodiments of the invention for which reason like reference numerals are employed to designate like parts throughout the views. This guard is best shown in FIG. 5 wherein it will be observed that it is fashioned from a length of suitably resilient spring steel wire of requisite length and gauge. The wire is bent upon itself between its ends to provide a pair of opposed arms or limbs 22 which are of corresponding length and construction and which are joined by way of a laterally directed U-shaped bend or bent portion 24 which constitutes a stirrup-like catch which is normally engaged under the tension of the wire with the barbed hook in the manner shown in FIGS. 1–4, inclusive. This catch provides a satisfactory detent and is saddled in place in the manner illustrated. The free end portions of the wire are bent as at 26 to define a pair of depending spaced parallel legs 28 and when the guard is in position on the hook to span or bridge the gap between the eye and the pointed barb the bends or bent portions 26 pass through the eye 12, permitting the legs 28 to be superimposed upon the shank and welded or otherwise fixedly joined in place. While the guard shown in FIGS. 1 to 3, inclusive, has eye means slightly different from the eye means shown in the modification in FIG. 4, the construction is basically the same in that each limb is coiled upon itself to provide a ring-like eye. Both eyes are basically the same in construction and are denoted by the numerals 30 and they can be directly lined up with each other as shown in FIGS. 4 and 5 or slightly offset as shown for example in FIGS. 1 to 3, inclusive. In any event, the two eyes constitute the "eye means" carried by the median portions of the arms or limbs of the guard. This type of weed guard is applicable to all sizes of single shank fishhooks commonly in use. It is especially suited for use with live bait (minnows, frogs, worms, etc.) inasmuch as it permits the bait to be attached in the normal manner and to maintain the bait in a live state as long as reasonably possible.

The manner of attaching the line or leader is such that it overcomes the tendency of the line or leader to become hooked around or tangled with the guard when the lure is cast, trolled, or through the swimming action of a live bait while still fishing.

Figure 1:
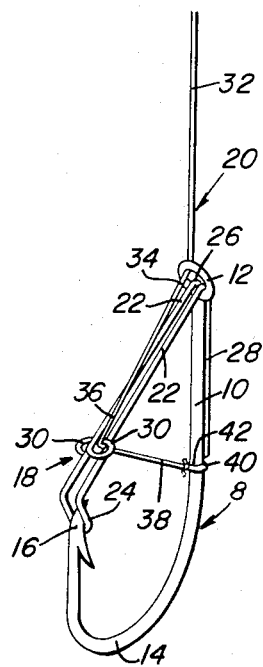
FIG. 1 is a view in perspective of a weedless fishhook embodying the improved bite and line responsive weed guard showing the guard in its normal tension closed position.
Figure 2:
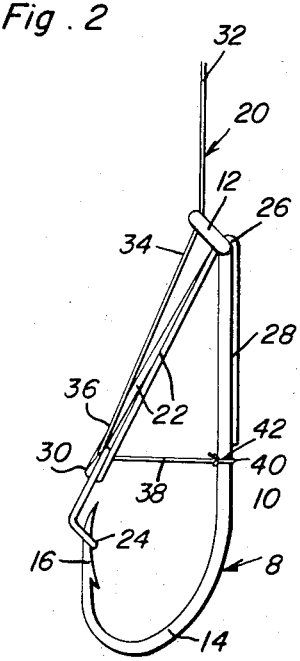
FIG. 2 is a side elevation of the same.
Figure 3:
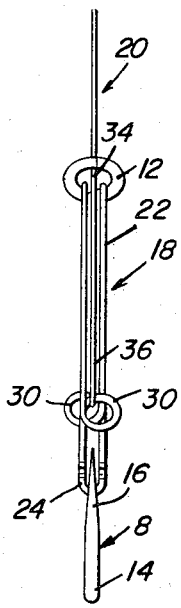
FIG. 3 is a front edge elevation observing FIG. 2 in a direction from left to right.

It can be pointed out here that the manner of using the line in connection with the weed guard varies and this is the principal distinction between the form of the invention appearing in FIGS. 1 to 3 and the modification or alternate form shown in FIG. 4. With reference now to FIGS. 1 to 3, it will be noted that the portion 32 of the line is above the eye 12, that a portion 34 passes through the eye and downwardly, that a lower portion thereof denoted at 36 is then threaded from left to right (FIG. 2 for example), this being the free end portion 38, the terminal end 40 of the latter being tied and anchored in a groove 42 provided therefore in the median portion of the shank. The line 20A in the modification in FIG. 4 is threaded and handled in a slightly different manner. Here the portion 44 is above the eye and a depending portion 46 is passed downwardly along the shank where it is then threaded through an eye or staple 48 provided therefor and fixed on the shank for cooperation with the eye means (the two eyes 30) of the weed guard. Here the terminal 50 of the end portion 52 is knotted and tied and thus secured to the alined overlapping eyes 30.

It will be noted that by providing the double strands or legs 22 and the U-shaped catch 24, the bight portion of the latter engages the underside of the terminal of the hook, that is between the point and the barb as shown in the views of the drawing.

With this construction it will be evident that the novel weed guard and the manner in which the leader is associated therewith and the shank of the hook affords the fisherman a way of positively retracting the guard and clearing the barbed hook the very moment he senses a srike of a fish. It is evident therefore that the step of depressing and opening the guard is no longer wholly up to the fish or depending on a biting action as is ordinarily the case. A pull on the line 20 at the instant of the strike serves to automatically open the guard and to pave the way for effective access to the hook by the fish.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a weedless fishhook embodying a shank provided at one end with a return-bent hook terminating in a barbed bill and at the other end with an eye, a pressure and pull responsive yieldable weed guard carried by said shank, diagonally bridging the usual gap between the barbed hook and shank, said guard being normally yieldingly closed, and a fishing line leader extending through said eye and oriented with said shank and barbed bill and having a portion thereof extending generally at right angles to and operatively connected directly to an intermediate point along the length of said guard and affording the fisherman a means of positively retracting said guard and clearing the hook the moment he senses the strike of a fish, whereby the opening action of the guard is not wholly dependent, as usual, upon the biting of the fish to depress and open the guard.

2. The structure defined in claim 1, and wherein said leader has one end secured to said shank, that portion of the leader connected with said guard being movable relative to and allowing said guard to open and close freely and without hindrance traceable to said leader.

3. The structure defined in claim 1, and wherein a portion of the leader is slidingly connected to said shank, that portion of said leader which is connected to said guard being positively secured to and anchored on said guard.

4. The structure according to claim 1, and wherein said guard is provided with a terminal lateral U-bend defining a stirrup-like catch, the barbed end of said hook being removably seated in said catch.

5. In combination, a weedless fishhook comprising a single stright shank having a barbed hook at one end and a line eye at the other end, a pull and pressure responsive spring wire weed guard diagonally bridging the usual gap between the barbed hook and said eye and having one end connected with said eye and the other end being free and provided with a catch releasably joined to the barbed bill portion of said hook, the median portion of said guard having eye means, and a fishing line leader having a terminal end secured to a median portion of said shank, a first portion slidingly threaded through the eye means on said guard and a second portion passing slidingly through said line eye.

6. In combination, a weedless fishhook comprising a single straight shank having a barbed hook at one end and a line eye at the other end, a pull and pressure responsive spring wire weed guard diagonally bridging the usual gap between the barbed hook and said eye and having one end connected with said eye and the other end being free and provided with a catch releasably joined to the barbed bill portion of said hook, the median portion of said guard having eye means, and a fishing line leader having a first portion passing slidingly through said line eye, a second portion slidable through a guide provided therefor on a median portion of said shank, and a terminal end portion tied to the eye means on said guard.

7. The structure defined in claim 1, and wherein said weed guard comprises a length of spring steel wire bent upon itself between its ends and embodying a pair of spaced limbs joined at like ends by a laterally directed U-bend defining a stirrup-like fishhook engaging catch, having median portions coiled and defining line leader eyes, and having laterally bent free ends defining and providing legs for attachment to the fishhook's shank.

References Cited

UNITED STATES PATENTS

| 1,180,073 | 4/1916 | Payton | 43—43.4 |
| 2,123,598 | 7/1938 | Eliason | 43—43.4 |
| 2,948,985 | 8/1960 | Kizer | 43—43.4 |
| 3,169,338 | 2/1965 | Morin | 43—43.6 |

FOREIGN PATENTS

| 548,245 | 6/1956 | Belgium. |
| 762,498 | 11/1956 | Great Britain. |

SAMUEL KOREN, *Primary Examiner.*

J. H. CZERWONKY, *Assistant Examiner.*